No. 740,972. PATENTED OCT. 6, 1903.
B. F. BOOTH.
AUTOMATIC HOG WATERER.
APPLICATION FILED MAR. 21, 1903.
NO MODEL.
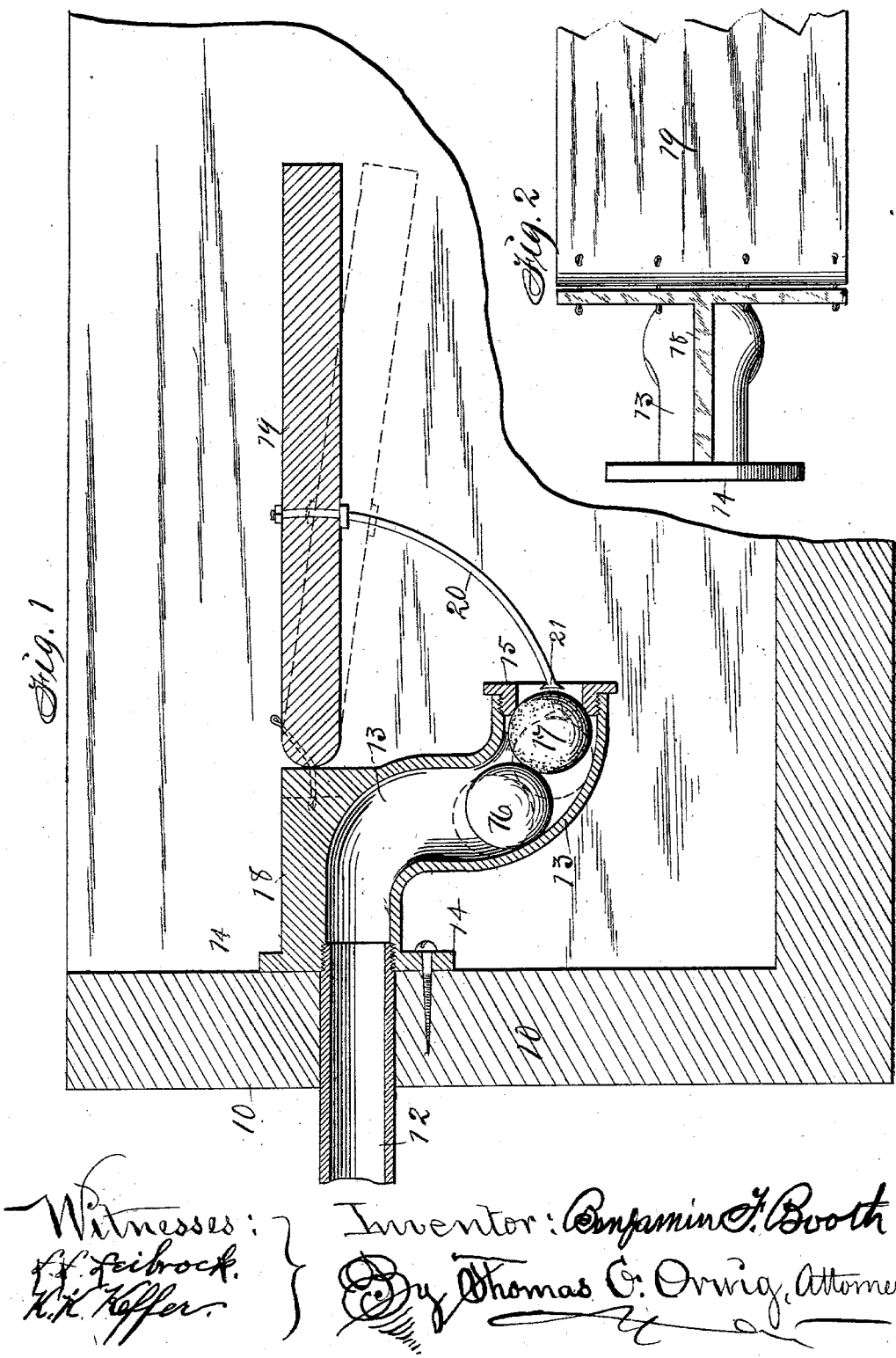

No. 740,972.     Patented October 6, 1903.

UNITED STATES PATENT OFFICE.

BENJAMIN F. BOOTH, OF INDIANOLA, IOWA.

AUTOMATIC HOG-WATERER.

SPECIFICATION forming part of Letters Patent No. 740,972, dated October 6, 1903.

Application filed March 21, 1903. Serial No. 148,995. (No model.)

*To all whom it may concern:*

Be it known that I, BENJAMIN F. BOOTH, a citizen of the United States, residing at Indianola, in the county of Warren and State of Iowa, have invented a new and useful Automatic Hog-Waterer, of which the following is a specification.

My object is to provide an improved valve-chamber specially adapted to be readily fixed to the inside of a water-trough for inclosing a broad flat ball-valve and combining a float therewith to automatically convey water from a source of supply as required to maintain sufficient water in the trough continually for animals and also as required to prevent any overflow and waste of water.

My invention consists in the construction, arrangement, and combination of parts, as hereinafter set forth, pointed out in my claim, and illustrated in the accompanying drawings, in which—

Figure 1 is a sectional view of my invention applied to a portion of a water-trough as required for practical use. Fig. 2 is a top view of the water-chamber and a portion of a float hinged thereto.

The numeral 10 designates the end of a trough adapted for watering animals, and 12 the end of a pipe fixed therein to be connected with a source of supply for conveying water into the trough. The valve-chamber 13 is in the form of a double curved pipe that has a flange at its top end adapted for fixing the chamber direct to the inside of a trough and an internal screw adapted to receive the screw-threaded end of the supply 12, as required to produce a water-tight joint and to facilitate and aid in securely fixing the valve-chamber direct to the inside face of the trough by means of screws passed through the perforated flange 14 into the wood, as shown in Fig. 1. The lower end of the double curved valve-chamber 13 has an internal screw adapted for detachably connecting a valve-seat 15 therewith that has an external screw, as shown in Fig. 1, after a metal ball 16 and a rubber ball 17 have been placed in the valve-chamber. On top of the valve-chamber is an integral central rib 18 that has lateral extensions specially adapted for hinging a float 19 thereto by means of flexible wires, as shown, or in any suitable way that will allow the float in the form of a broad and flat piece of board to descend, as indicated by dotted lines in Fig. 1 and as required for opening the valve to allow water to flow into the trough. A curved metal rod 20 is fixed to the float, as shown, or in any suitable way and terminates with an enlargement 21, adapted to engage the rubber ball-valve 17 in such a manner that when the water is lowered in the trough and the float descends the weight thereof will press the rubber ball and the metal ball upward in the valve-chamber as required to allow water to flow into the trough, and when the water rises in the trough to lift the float to its normal position the metal ball will by force of gravity press the rubber ball on the valve-seat 15 as required to close the valve and stop the flow of water.

Having thus described the purpose of my invention, its construction, application, and automatic operation, the practical utility thereof will be readily understood by farmers and others familiar with the subject, and—

What I claim as new, and desire to secure by Letters Patent, is—

A valve-chamber for hog-troughs cast complete in one piece and provided at its top with a flange and screw-threaded bore for connecting a screw-threaded supply-pipe, and lateral extensions for connecting a broad flat float and an internal screw at its lower end for connecting a valve-seat, a flat float hinged to said extensions, a curved rod fixed to the under side and central portion of the float and two round balls inclosed in the valve-chamber, arranged and combined as shown and described for the purposes stated.

BENJAMIN F. BOOTH.

Witnesses:
Z. T. HUTT,
W. G. STANLEY.